US005152543A

United States Patent [19]

Sims et al.

[11] Patent Number: 5,152,543

[45] Date of Patent: Oct. 6, 1992

[54] COMPOSITE FRAME WHEELCHAIR

[75] Inventors: Larry A. Sims, Thousand Oaks; Robert W. Reynolds, Camarillo; Raymond P. Lewandowski; Robert T. McWethy, both of Ventura, all of Calif.

[73] Assignee: Everest & Jennings, Inc, Camarillo, Calif.

[21] Appl. No.: 614,164

[22] Filed: Nov. 15, 1990

[51] Int. Cl.[5] .......... B62M 1/14

[52] U.S. Cl. .......... 280/250.1; 280/281.1; 280/304.1; 297/365; 297/379

[58] Field of Search .......... 280/281.1, 250.1, 304.1, 280/647, 657, 650; 297/DIG. 1, DIG. 2, DIG. 4, 353, 354, 363, 364, 365, 378, 379

[56] References Cited

U.S. PATENT DOCUMENTS

| | | | |
|---|---|---|---|
| 2,515,261 | 7/1950 | Poskin | 297/364 |
| 4,170,368 | 10/1979 | Southward | 280/250.1 |
| 4,301,060 | 11/1981 | Underwood et al. | 260/42.49 |
| 4,358,125 | 11/1982 | Charles | 280/250.1 |
| 4,593,929 | 6/1986 | Williams | 280/650 |
| 4,643,446 | 2/1987 | Murphy et al. | 280/657 |
| 4,684,149 | 8/1987 | Meyer | 280/657 |
| 4,805,925 | 2/1989 | Haury et al. | 280/250.1 |
| 4,828,781 | 5/1989 | Duplessis et al. | 264/250 |
| 4,856,801 | 8/1989 | Hollingsworth | 280/284 |
| 4,887,826 | 12/1989 | Kantner | 280/250.1 |
| 4,900,049 | 2/1990 | Tseng | 280/281.1 |
| 4,917,395 | 4/1990 | Gabriele | 280/250.1 |
| 4,923,203 | 5/1990 | Trimble et al. | 280/281.1 |
| 4,967,864 | 11/1990 | Boyer et al. | 297/DIG. 4 |
| 4,968,051 | 11/1990 | Luo | 280/304.1 |
| 4,974,905 | 12/1990 | Davis | 297/DIG. 4 |
| 5,011,172 | 4/1991 | Bellanca et al. | 280/281.1 |

FOREIGN PATENT DOCUMENTS

| | | | |
|---|---|---|---|
| 3-34823 | 3/1991 | Japan . | |
| 85/01205 | 3/1985 | PCT Int'l Appl. . | |
| 2148805 | 6/1985 | United Kingdom | 280/250.1 |
| 8103610 | 12/1981 | World Int. Prop. O. | 280/250.1 |

*Primary Examiner*—Charles A. Marmor
*Assistant Examiner*—A. M. Boehler
*Attorney, Agent, or Firm*—Kelly Bauersfeld & Lowry

[57] ABSTRACT

An improved wheelchair is constructed with a base frame formed from composite material tubing. The base frame comprises a pair of unitary side frames of composite material tubing which preferably has an elliptical cross section oriented to provide increased structural strength along a primary loading axis during normal use. The side frames are interconnected by a plurality of cross braces of composite material tubing, wherein the lengths of the cross braces can be selected in accordance with a desired wheelchair frame width. A folding seatback is mounted on the side frames for releasable locking in an upright orientation, with a pair of spring-loaded lock pins being releasable by pulling a pull cord to permit seatback folding to a collapsed condition.

11 Claims, 4 Drawing Sheets

FIG. 1
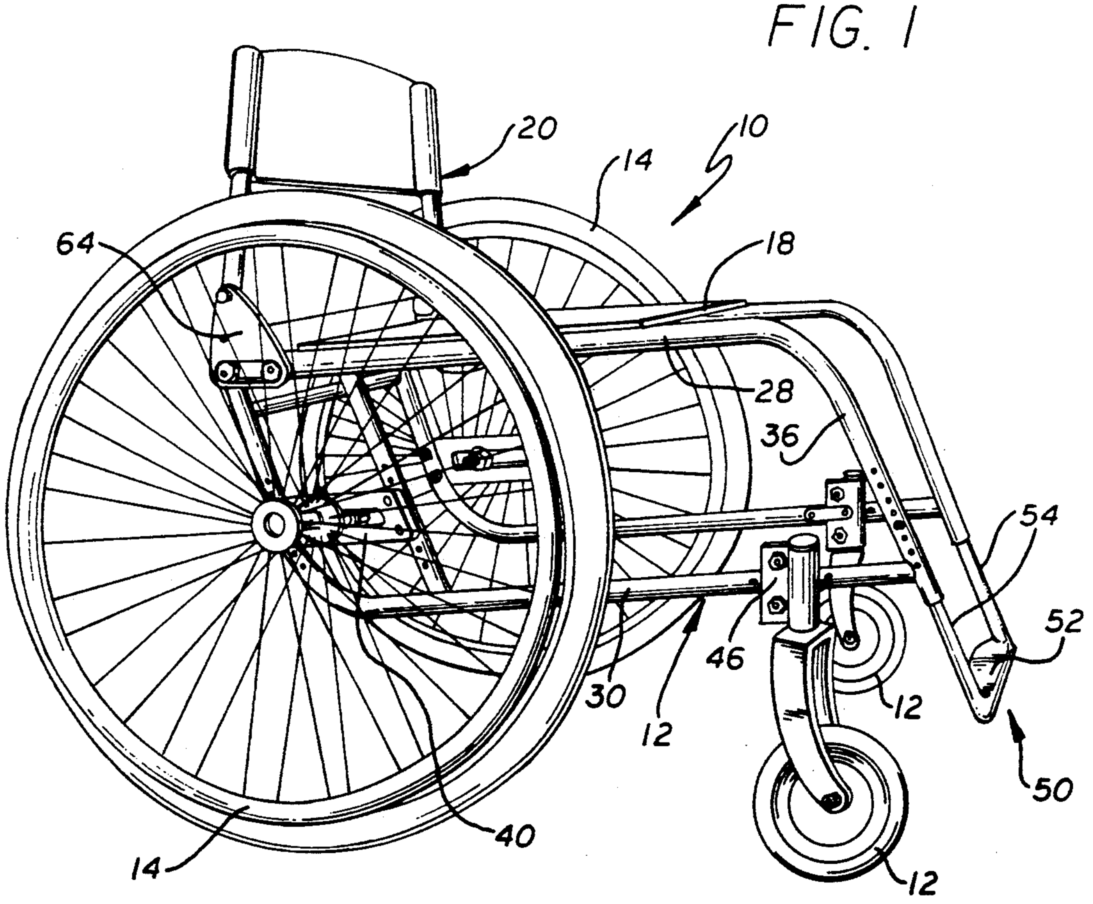
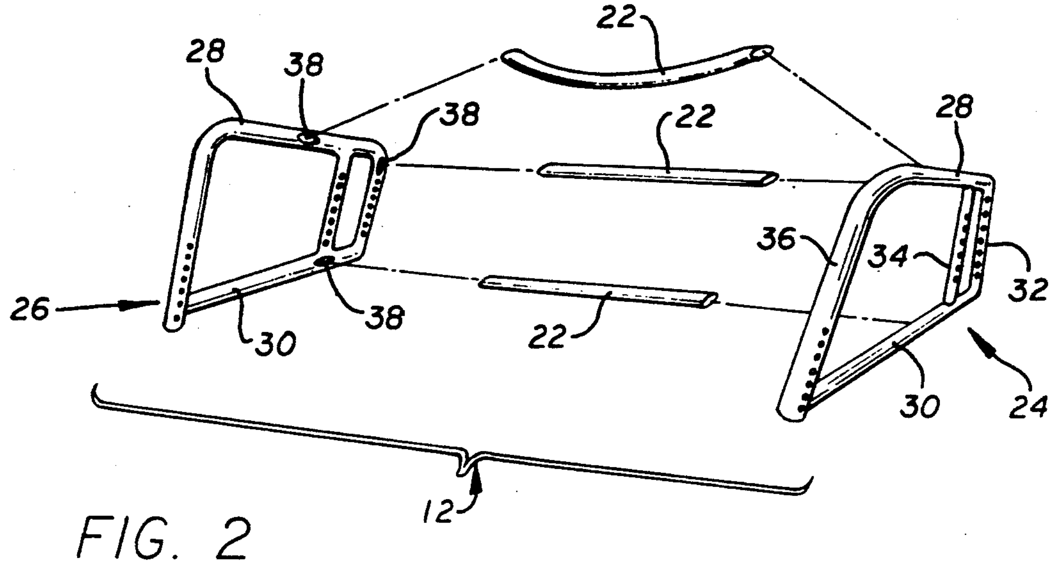
FIG. 2

FIG. 6
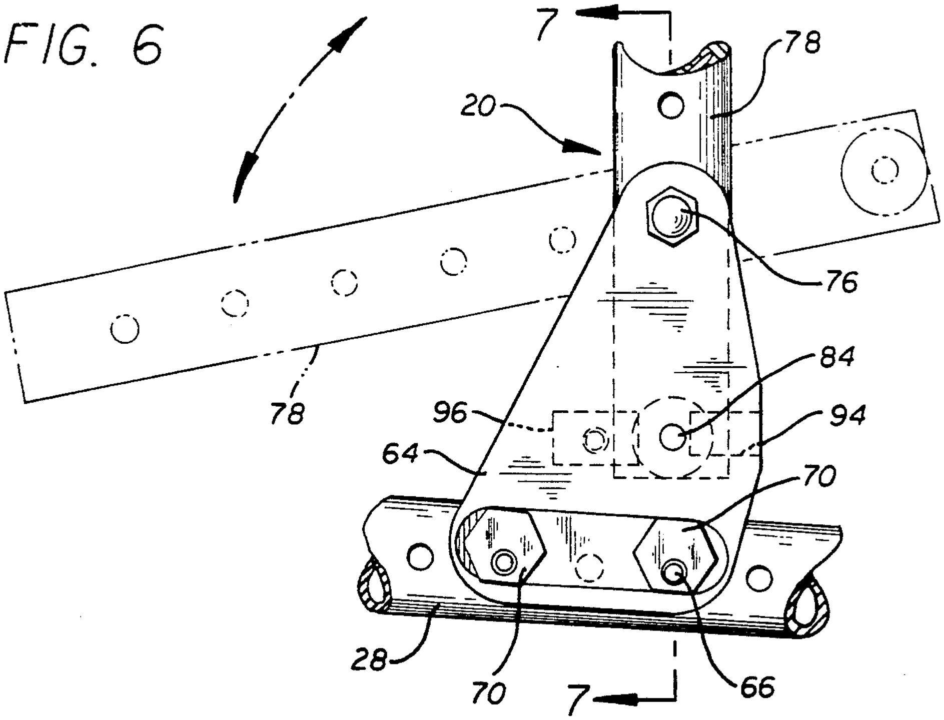
FIG. 7
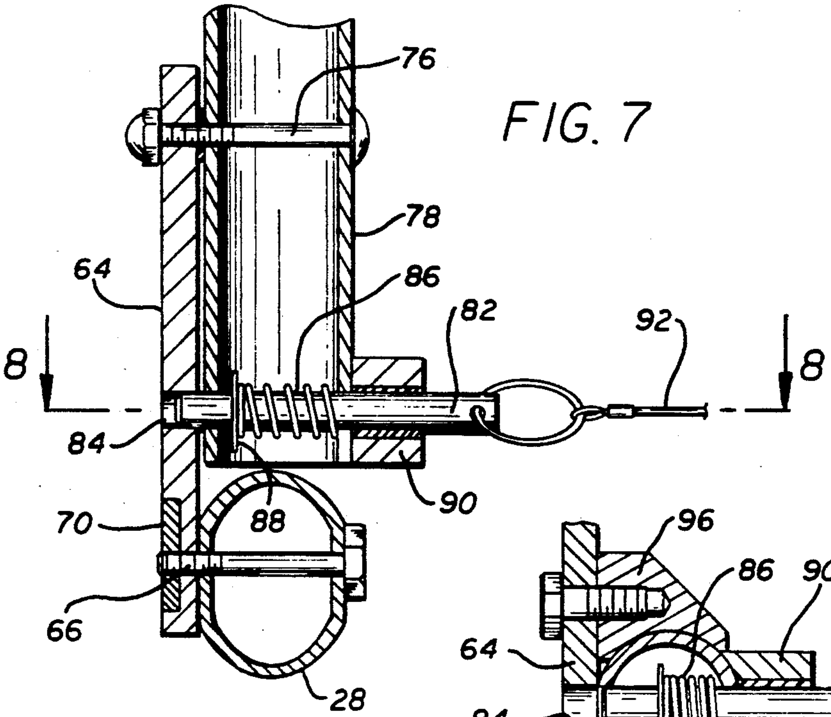
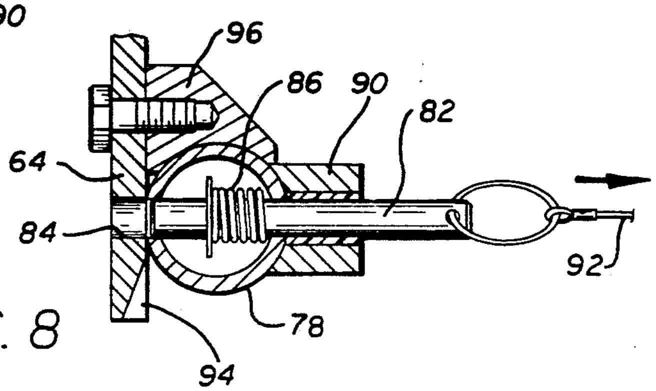
FIG. 8

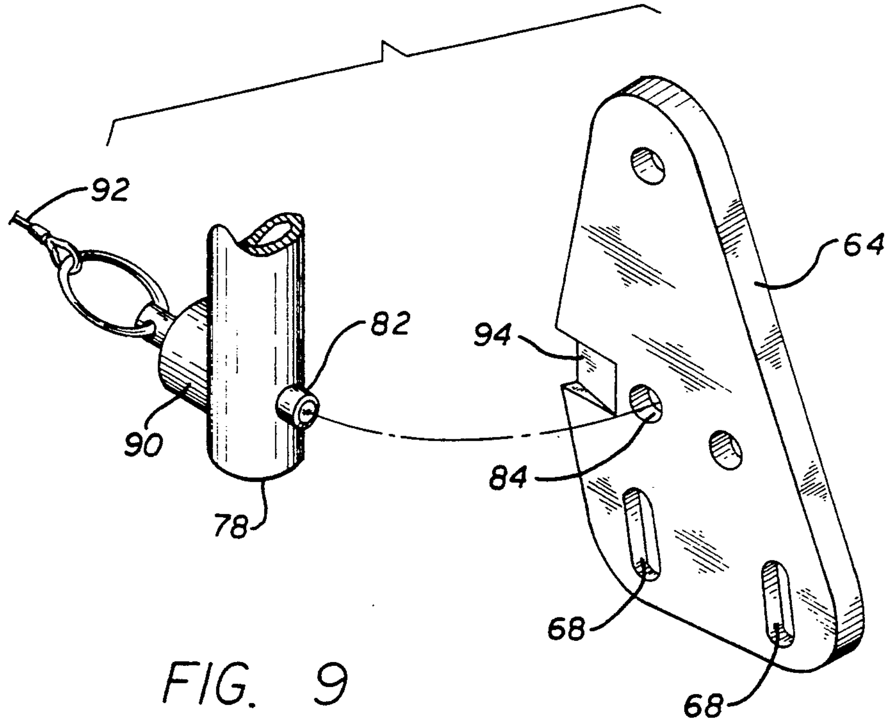
FIG. 9
FIG. 10
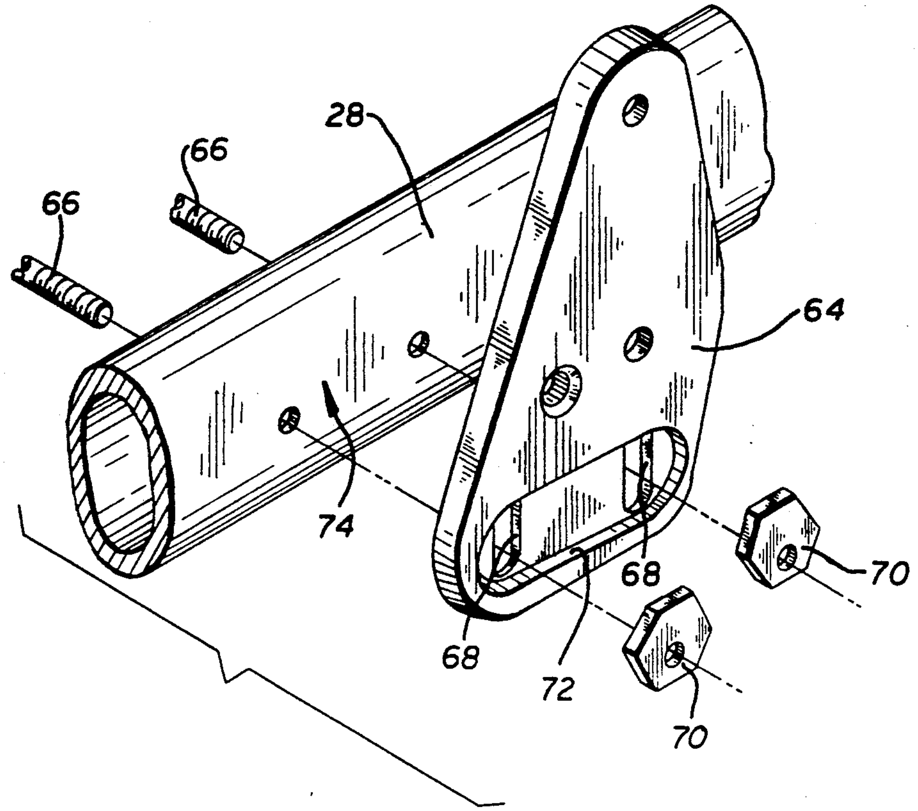

COMPOSITE FRAME WHEELCHAIR

BACKGROUND OF THE INVENTION

This invention relates generally to improvements in wheelchair frame constructions. More particularly, this invention relates to an improved wheelchair frame formed predominantly from composite materials and adapted for facilitated assembly to provide a wheelchair base frame of variable size width.

In the past, wheelchair frames have been constructed primarily from metal tubing materials, wherein lengths of metal tubing are bent or otherwise suitably shaped to define individual components of a wheelchair frame. Various tubing components are then interconnected by welding or the like to provide frame structures which can be of a rigid unitary construction when assembled, or otherwise adapted to fold to a collasped condition for easy transport and/or storage. The manufacturing processes involved in shaping and interconnecting the various tubing structures contributes directly and significantly to the costs of the wheelchair to the ultimate user.

The present invention provides a significant improvement upon traditional wheelchair frame constructions by forming a base frame for a wheelchair from relatively high strength yet lightweight composite materials. The frame construction is adapted for facilitated assembly in a manner permitting significant variable adjustment of wheelchair width, thereby permitting the wheelchair frame to be constructed in a customized size for a specific user.

SUMMARY OF THE INVENTION

In accordance with the invention, an improved wheelchair includes a base frame formed from composite material tubing to provide a high strength and lightweight frame construction. The wheelchair base frame is defined by a pair of side frames of composite material, in combination with a plurality of cross braces of composite material. The assembled side frames and cross braces define a base frame structure upon which other components of the wheelchair can be mounted, such as wheels, seat, seatback, and the like.

In accordance with the preferred form of the invention, the side frames of the wheelchair comprise a pair of unitary structures formed from high strength composite material tubing having an elliptical cross sectional shape oriented to provide increased structural strength along a primary loading axis during normal use. Short mounting stubs are formed integrally at predetermined locations on the inboard sides of the side frames for facilitated reception into and adhesive connection with a plurality of cross braces which are also formed from the composite material tubing. The cross braces are chosen with a selected width to define the overall size width of the assembled base frame. The side frames further include means for mounting of conventional wheelchair wheels, in addition to a generally U-shaped footrest. In the preferred form, the footrest is also formed from composite material tubing.

According to further aspects of the invention, the side frames are adapted for variable position mounting of a seatback unit to accommodate folding movement of a seatback between a locked upright position and a collapsed position folded over a wheelchair seat. The seatback unit includes a pair of mounting brackets projecting upwardly from the side frames adjacent the rear ends thereof and including means for pivotal connection to the seatback. Spring-loaded locking pins carried by the seatback are urged outwardly for normal reception into and locking engagement with lock ports on the mounting brackets to retain the seatback in the normal upright position. A pull cord interconnects the locking pins at the opposite sides of the seatback and extends transversely across the wheelchair frame. The locking pins can be disengaged from the mounting brackets by merely pulling upon the pull cord, thereby permitting folding movement of the seatback to the collapsed condition.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a perspective view illustrating a composite frame wheelchair embodying the novel features of the invention;

FIG. 2 is an exploded perspective view illustrating components of the wheelchair formed from composite material and adapted for assembly to define a base frame;

FIG. 6 is a further enlarged fragmented side elevational view illustrating portions of a seatback unit and related mounting structure;

FIG. 7 is an enlarged vertical sectional view taken generally on the line 7—7 of FIG. 6;

FIG. 8 is a fragmented horizontal sectional view taken generally on the line 8—8 of FIG. 7;

FIG. 9 is an enlarged exploded perspective view illustrating portions of the seatback unit mounting structure; and FIG. 10 is an enlarged exploded perspective view illustrating mounting brackets for variable position connection to the base frame of the wheelchair.

DETAILED DESCRIPTION OF THE PREFERRED EMBODIMENT

Figure 3:
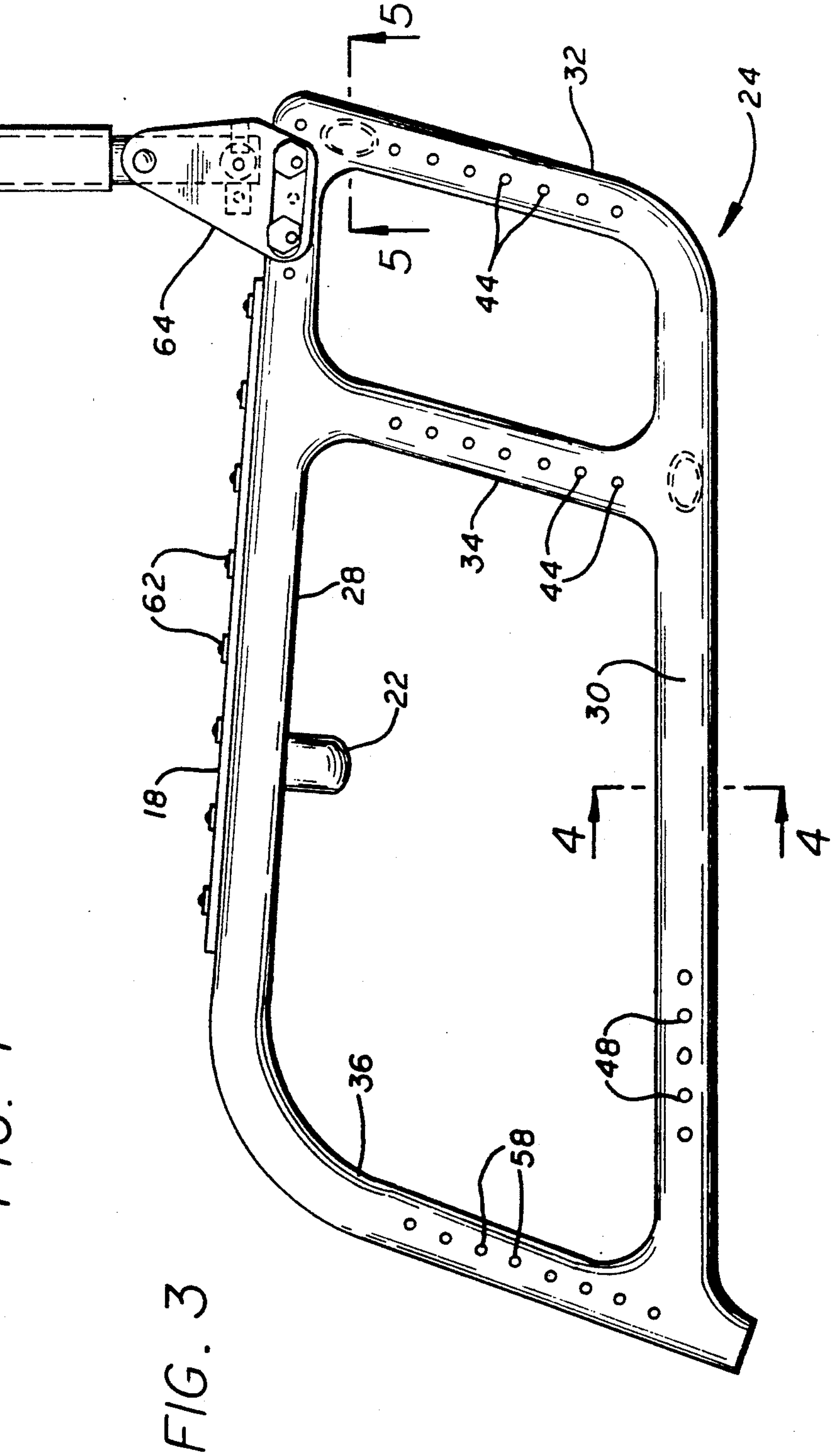
FIG. 3 is an enlarged side elevational view illustrating portions of the wheelchair frame.

As shown in the exemplary drawings, a wheelchair referred to generally in FIG. 1 by the reference numeral 10 includes a base frame 12 constructed from composite material tubing. The base frame 12 provides the support structure for mounting of additional wheelchair components to include relatively large rear wheels 14, comparatively smaller front caster wheels 16, a wheelchair seat 18, and a seatback unit 20.

In accordance with one primary aspect of the improved wheelchair 10 of the present invention, the base frame 12 is constructed from relatively lightweight and high strength composite material tubing. The composite material components used to form the base frame 12 are manufactured in accordance with economical bladder molding or similar manufacturing methods for producing tubular composite structures of selected and relatively complex shape. The base frame 12 is formed from a relatively small number of composite material components which are adapted for easy assembly to define a rigid base frame structure. Importantly, the width of the assembled base frame can be selectively varied to customize wheelchair size by appropriate selection of cross braces (FIG. 2) of selected length. Moreover, in accordance with a further aspect of the invention, the seatback unit 20 is adapted for adjustable position mounting onto the base frame 12, with improved locking means for releasably locking the seatback in the normal upright orientation as viewed in FIG. 1.

Figure 5:
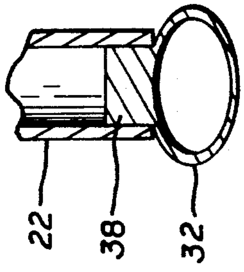
FIG. 5 is an enlarged horizontal sectional view taken generally on the line 5—5 of FIG. 3.
Figure 4:
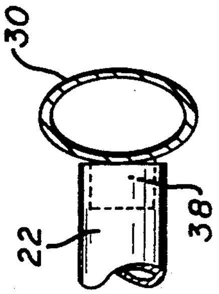
FIG. 4 is an enlarged vertical sectional view taken generally on the line 4—4 of FIG. 3.

With reference to FIGS. 2-5, the composite material base frame 12 includes a pair of side frames 24 and 26 adapted for interconnection by means of a plurality of the cross braces 22. The illustrative side frames 24 and 26 each include upper and lower frame rails 28 and 30 extending generally in a fore-aft direction. The upper and lower frame rails 28 and 30 are interconnected near the rear ends thereof by a spaced pair of generally upright support posts 32 and 34. In addition, the rails 28 and 30 are interconnected near their forward ends by a generally upright frame post 36. To enhance the esthetic appearance of each side frame, the support posts 32 and 34 are normally oriented parallel to each other and may be inclined with respect to a vertical direction. Similarly, for esthetic purposes, the forward frame post 36 may be provided as a downturned continuation of the upper frame rail 28. The lower end of the frame post 36 is joined integrally to and extends slightly beyond the associated lower frame rail 30.

The side frames 24 and 26, as described above, are each formed as a one-piece unit from high strength composite material such as a carbon or carbon-epoxy and/or filter composition. A preferred manufacturing method is a bladder molding technique such that the various side frame components have a hollow tubular geometry. In the preferred form, as shown best in FIGS. 4 and 5, the tubular frame geometry defines a generally elliptical or oval cross section oriented for increased structural strength along a primary loading axis during normal wheelchair use. In this regard, the frame rails 28 and 30 have an elliptical cross section with a long or major axis extending generally in the vertical direction. Similarly, the support posts 32 and 34 as well as the frame post 36 have an elliptical cross section with a major axis extending generally in a fore-aft direction.

The cross braces 22 (FIG. 2) are also formed from a composite material to have a hollow tubular construction, preferably with an elliptical cross section for improved structural strength in a selected direction. The cross braces 22 are adapted for relatively snug slide fit over short mounting stubs 38 which project a short distance from the inboard sides of the side frames 24 and 26 at selected positions. Importantly, the mounting stubs 38 on the two side frames 24 and 26 are arranged in aligned pairs for respective reception into the opposite ends of an associated cross brace 22. FIG. 2 illustrates three cross braces 22 being used to interconnect the side frames 24 and 26. A suitable adhesive or bonding agent permanently affixes the side frames to the cross braces, resulting in a rigid wheelchair base frame 12.

The base frame 12 defines the support structure upon which remaining components of the wheelchair are mounted quickly and easily. For example, with reference to FIGS. 1 and 3, rear wheel mounting plates 40 can be secured quickly and easily by means of bolts or the like passed through selected ones of a plurality of mounting ports 44 formed in the rear support posts 32 and 34 of each side frame. The rear wheel mounting plates 40 provide suitable structure for removable mounting of the large rear wheels 14 of the wheelchair, all in a manner known to those skilled in the art. The mounting ports 44 on the rear support posts permit variable vertical positioning of the rear wheels 14, whereas the wheel mounting plates 40 typically provide means for varying the wheel mounting position in the fore-aft direction. In addition, the mounting plates may include camber adjustment means, in any suitable manner known to those skilled in the art.

The front caster wheels 16 are also mounted at appropriate positions along the lower frame rail 30 of each side frame. FIG. 1 illustrates the caster wheels with appropriate mounting brackets 46 fastened onto the lower frame rails 30 at one of several selected fore-aft positions defined by an array of mounting ports 48 in the lower frame rail.

Similarly, the forward frame posts 36 of the side frames 24 and 26 accommodate relatively simple mounting of a U-shaped footrest 50 (FIG. 1). The U-shaped footrest is also formed in the preferred version of the invention as a tubular composite material with an appropriate width corresponding with the lengths of the cross braces 22. The footrest defines a lower transverse footplate 52 for supporting the feet of a person using the wheelchair, together with upstanding legs 54 which are slidably received into the lower ends of the forward frame posts 36. Suitable locking pins are provided for variably selecting the vertical position of adjustment of the footrest 52, by appropriate pin registration with one of several mounting ports 58 formed in the forward frame posts 36.

The wheelchair seat 18 is also mounted quickly and easily onto the upper frame rails 28 of the base frame 12 by suitable screws 62 or the like. The illustrative seat 18 comprises a flexible fabric sling, although it will be understood that other seat constructions can be used. It will be noted, however, that the cross brace 22 immediately underlying the seat 18 may be downwardly bowed for clearance with the seat when the seat is occupied by a person riding the wheelchair.

The seatback unit 20 is mounted onto the base frame 12 at the rear of the upper frame rails 28. More particularly, as shown in FIGS. 6-10, the seatback unit comprises a pair of mounting brackets 64 fastened onto the outboard sides of the upper frame rails 28 by means of mounting bolts 66 or the like. As shown best in FIG. 10, the mounting bolts 66 are passed through the upper frame rail 28 in an outboard direction and further through vertically elongated apertures 68 in the associated bracket 64 for threaded reception into eccentric hex nuts 70. The hex nuts 70 have a size and shape for nonrotational fit into an elongated recessed 72 formed in the outboard side of the bracket 64, such that the vertical and/or the fore-aft position of the mounting bracket 64 can be chosen relative to the base frame 12 by the rotational position of the hex nuts 70 within the recess 72. Moreover, the comparative rotational positions of the two hex nuts 70 may be different, such that the mounting bracket 64 can be tilted forwardly or rearwardly, as desired by an individual wheelchair user. In addition, a portion of the side frame may define a flat 74 for stable seated mounting of the mounting bracket 64 when the bolts 66 are threadably advanced through the hex nuts 70.

The mounting brackets 64 are connected by pivot bolts 76 to a pair of seatback posts 78 having a fabric seatback 80 or the like connected therebetween. As shown in FIGS. 6 and 7, the seatback posts 78 project downwardly a short distance below the associated pivot bolt 76, when the seatback 80 is in a generally upright position. Spring-loaded locking pins 82 (FIGS. 7-9) extend transversely through the lower ends of the seatback posts 78 in an outboard direction for locking registration into lock ports 84 in the mounting bracket 64. A compression spring 86 is provided with each pin 82 and reacts between the seat back post 78 and a retainer 88 to urge the lock pin 82 in an outboard direction for normal reception into the lock port 84.

The spring-loaded lock pins 82 protrude in an inboard direction through a bushing 90 for connection to a flexible pull cord 92. The pull cord 92 extends transversely across the rear of the wheelchair base frame 12 and interconnects the two lock pins 82 with each other. Accordingly, when the pull cord 92 is pulled, an appropriate retraction force is applied to both of the spring-loaded locking pins 82 to withdraw the locking pins from their associated lock ports 84 in the mounting brackets 64. Upon such pin withdrawal, the seatback can be folded forwardly toward a position collapsed over the wheelchair seat 18, as depicted in the dotted line rendering of FIG. 6.

When it is desired to pivot the seatback toward a normal upright position, the seatback is manually grasped and pivoted upwardly. Such swinging motion of the seatback displaces the outboard end of the spring-loaded locking pins 82 into ramped tracks 94 formed in the rear edges of the mounting brackets 64. The ramped tracks 94 caused the pins 82 to retract against their respective springs 86 as the seatback is moved toward the upright position. The thus-retracted pins 82 are retained in the retracted position until the seatback reaches the upright position, at which time the pins 82 are realigned with the lock ports 84 for spring-loaded engagement therewith. When this spring-loaded reengagement occurs, a forward margin of the seat posts 78 are displaced against stops 96 mounted onto the mounting brackets 64.

A variety of modifications and improvements to the improved wheelchair frame construction and related folding seatback unit are believed to be apparent to those skilled in the art. Accordingly, no limitation on the invention is intended by way of the foregoing description and accompanying drawings, except as set forth in the appended claims.

What is claimed is:

1. A wheelchair frame assembly, comprising:

first and second side frames each formed as a unitary component from composite material, each of said side frames including an upper rail and a lower rail extending generally in a fore-aft direction and having a generally elliptical cross sectional shape with the major axes thereof extending generally in a vertical direction, at least one generally upright rear support post connected between said upper and lower rails at one end thereof, and a forward frame post connected between said upper and lower rails at an opposite end thereof, said rear support post and said forward frame post having a generally elliptical cross sectional shape with the major axes thereof extending generally in a fore-aft direction, said side frames each defining an inboard side and an outboard side and having a plurality of relatively short mounting stubs at the inboard sides thereof, said mounting stubs of said first and second side frames being arranged in aligned pairs; and a plurality of cross braces formed from composite material and having a selected length defining the width of the wheelchair frame assembly, each of said cross braces extending between and being connected to one of said aligned pairs of said mounting stubs.

2. The wheelchair frame assembly of claim 1 wherein said cross braces are formed from composite material tubing, the opposite ends of each of said cross braces being slidably fitted over the associated aligned pair of said mounting stubs, and further including bonding means for securing said cross braces to said mounting stubs.

3. The wheelchair frame assembly of claim 2 wherein said cross braces have a generally elliptical cross sectional shape.

4. The wheelchair frame assembly of claim 1 wherein said first and second side frames are formed from composite material tubing.

5. The wheelchair frame assembly of claim 4 wherein said composite material tubing has a generally elliptical cross sectional shape.

6. The wheelchair frame assembly of claim 1 wherein said at least one rear support post comprises a pair of said rear support posts spaced a short distance from each other in the fore-aft direction.

7. The wheelchair frame assembly of claim 1 wherein said forward frame posts of said side frames have open lower ends, and further including a generally U-shaped footrest having a lower footplate member and a pair of upwardly extending legs slidably received into said forward frame posts.

8. The wheelchair frame assembly of claim 7 wherein said footrest is formed from a composite material.

9. The wheelchair frame assembly of claim 1 further including a seatback unit mounted onto said side frames, said seatback unit including a seatback and means for pivotally moving said seatback between a normal upright position and a collapsed position folded over the frame assembly.

10. The wheelchair frame assembly of claim 9 wherein said means for pivotally mounting said seatback comprises a pair of mounting brackets on said side frames, pivot members for pivotally mounting said seatback relative to said mounting brackets, a pair of spring-loaded lock pins carried on said seatback for normal reception into lock ports formed in said mounting brackets when said seatback is in the upright position, and a pull cord connected between said lock pins and adapted to be manually pulled to retract said lock pins from said lock ports and thereby permit swinging movement of the seatback to the collapsed position.

11. The wheelchair frame assembly of claim 10 wherein said mounting brackets include ramped tracks for retracting said lock pins upon swinging movement of the seatback from the collapsed position to the upright position.

* * * * *